(12) United States Patent
Narita (10) Patent No.: US 11,447,092 B2
(45) Date of Patent: Sep. 20, 2022

(54) PEDESTRIAN PROTECTION APPARATUS

(71) Applicant: TOYOTA JIDOSHA KABUSHIKI KAISHA, Aichi-ken (JP)

(72) Inventor: Sotaro Narita, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 489 days.

(21) Appl. No.: 16/512,382

(22) Filed: Jul. 16, 2019

(65) Prior Publication Data
US 2020/0023807 A1    Jan. 23, 2020

(30) Foreign Application Priority Data

Jul. 20, 2018 (JP) .............................. JP2018-136997

(51) Int. Cl.
| | | |
|---|---|---|
| *B60R 21/38* | (2011.01) | |
| *B60R 19/52* | (2006.01) | |
| *B60R 21/013* | (2006.01) | |
| *B60R 21/34* | (2011.01) | |

(52) U.S. Cl.
CPC .............. *B60R 21/38* (2013.01); *B60R 19/52* (2013.01); *B60R 21/013* (2013.01); *B60R 2021/346* (2013.01)

(58) Field of Classification Search
CPC .......... B60R 19/52; B60R 21/01; B60R 21/38
USPC ............ 296/193.1, 187.04, 187.09; 293/102, 293/121, 15, 120, 126, 154
See application file for complete search history.

(56) References Cited

U.S. PATENT DOCUMENTS

| | | | |
|---|---|---|---|
| 4,015,870 A | 4/1977 | Stcherbatcheff et al. | |
| 9,457,746 B1* | 10/2016 | Baccouche | B62D 21/152 |
| 9,457,748 B1 | 10/2016 | Kaufmann et al. | |
| 9,908,560 B2* | 3/2018 | Nusier | B60R 19/34 |
| 2004/0113459 A1 | 6/2004 | Mattsson et al. | |
| 2007/0228706 A1 | 10/2007 | Nagae et al. | |
| 2009/0242308 A1* | 10/2009 | Kitte | B60R 21/36 |
| | | | 180/271 |
| 2014/0175815 A1 | 6/2014 | Kim et al. | |
| 2015/0191145 A1 | 7/2015 | Farooq et al. | |
| 2015/0367812 A1* | 12/2015 | Cha | B60R 21/34 |
| | | | 293/131 |

(Continued)

FOREIGN PATENT DOCUMENTS

| | | |
|---|---|---|
| CN | 103895595 A | 7/2014 |
| CN | 105365744 A | 3/2016 |
| DE | 60226138 T2 | 5/2009 |

(Continued)

*Primary Examiner* — D Glenn Dayoan
*Assistant Examiner* — Sunsurraye Westbrook
(74) *Attorney, Agent, or Firm* — Hauptman Ham, LLP (57) ABSTRACT

A pedestrian protection apparatus includes a collision prediction unit which predicts a collision of a vehicle with a pedestrian existing forward of the vehicle, a grille which is disposed on a front surface of the vehicle so as to be inclined while rising toward the rear and attached to the vehicle in a state where an upper end portion of the grille is forwardly advanceable, and an actuator mechanism which causes, when the collision prediction unit predicts the collision of the vehicle with the pedestrian, the grille to be moved in such a manner that the upper end portion of the grille is advanced forward by a forward advancing amount greater than that of a lower end portion of the grille.

11 Claims, 10 Drawing Sheets

(56) References Cited

U.S. PATENT DOCUMENTS

2016/0046259 A1    2/2016  Jayasuriya et al.

FOREIGN PATENT DOCUMENTS

| | | |
|---|---|---|
| DE | 102013206460 A1 | 6/2014 |
| DE | 102014118731 A1 | 7/2015 |
| DE | 102014115247 A1 | 12/2015 |
| DE | 102014011218 B3 | 2/2016 |
| DE | 102016213063 A1 | 1/2018 |
| JP | 2007276503 A | 10/2007 |
| JP | 2007-320530 A | 12/2007 |
| JP | 201069970 A | 4/2010 |
| JP | 2015-120424 A | 7/2015 |

\* cited by examiner

PEDESTRIAN PROTECTION APPARATUS

CROSS REFERENCE TO RELATED APPLICATION

This application claims priority to Japanese Patent Application No. 2018-136997 filed on Jul. 20, 2018, which is incorporated herein by reference in its entirety including the specification, claims, drawings, and abstract.

TECHNICAL FIELD

The present disclosure discloses a pedestrian protection apparatus for protecting a pedestrian existing forward of a vehicle at the time of a collision of the vehicle with the pedestrian.

BACKGROUND

In recent years, a technique has been suggested as part of efforts to protect pedestrians, in which conditions around a vehicle are detected with a sensor or other means, and when it is predicted, based on a result of the detection, that a vehicle will collide with a pedestrian, a part or the whole of a grille is moved forward of the vehicle.

For example, Patent Document 1 (JP 2007-320530 A) discloses a technique in which a grille arranged above a bumper in a front portion of a vehicle is translated forward of the vehicle when a collision of the vehicle with a pedestrian is predicted. According to this technique, in addition to the bumper, the grille is also able to support the pedestrian. As a result, a local increase in a force to be input to a lower half of the body of a pedestrian can be effectively prevented from occurring.

CITATION LIST

Patent Literature

Patent Document 1: JP 2007-320530 A

However, there are cases where, in a structure of translating the entire grille to the front as described in Patent Document 1 (JP 2007-320530 A), only a part of the grille can function to support the pedestrian depending on a position and orientation of the grille. For example, when a grille has an inclined shape with its upper portion being shifted rearward, a lower end of the grill is, of course, projected forward the most. When such a grille is translated forward of the vehicle, only a portion around the lower end of the grille can make contact with the pedestrian, which should be improved in terms of dispersion of the force input onto the pedestrian.

In view of the above circumstances, the present disclosure discloses a pedestrian protection apparatus capable of protecting a pedestrian with an improved degree of reliability.

SUMMARY

A pedestrian protection apparatus according to an aspect of the present disclosure includes a collision prediction unit which is configured to predict a collision of a vehicle with a pedestrian existing forward of the vehicle, a grille which is disposed on a front surface of the vehicle so as to be inclined while rising toward the rear, and has an upper end portion attached to the vehicle in a forwardly advanceable state, and an actuator mechanism which is configured to cause, when the collision prediction unit predicts the collision with the pedestrian, the grille to be moved in such a manner that the upper end portion of the grille is forwardly advanced by a forward advancing amount greater than that of a lower end portion of the grille.

With the above-described structure, an amount of protrusion of the grille from a front end of the vehicle can become smaller than that of a grille according to a conventional technique in which the entire grille is translated forward. Further, the above structure allows a position of the grille on a collision site where the grille collides with the pedestrian to become substantially parallel to the pedestrian, which can contribute to broadening of an area of contact with the pedestrian, and can, in turn, mitigate local concentration of a load. As a result, it becomes possible to protect the pedestrian with a higher degree of reliability.

In the above-described structure, the grille is attached to the vehicle in a state of being swingable for changing an angle of inclination of the grille, and the actuator mechanism may swing the grille in order to forwardly advance the upper end portion of the grille.

In the swingable structure of the grille, the forward advancing amount of the upper end portion of the grille easily becomes greater than that of the lower end portion of the grille, which can lead to simplification of the structure.

Further, in the above structure, the grille may be swung about a shaft which is arranged on the grille at a location lower than the upper end portion and is fixed to the vehicle.

The positioning of the shaft for swinging lower than the upper end portion of the grille can ensure that the forward advancing amount of the upper end portion of the grille always becomes greater than that of the lower end portion of the grille.

In another aspect, the actuator mechanism may cause the grille to be moved within a range where the top end of the grille is not forwardly protruded from a foremost extremity of the vehicle.

Because, in the above structure, a possibility of the grille being forwardly protruded over the foremost extremity of the vehicle is eliminated, an unnecessary collision with the pedestrian can be prevented from occurring.

In another aspect, the collision prediction unit may identify a physique of the pedestrian, and the actuator mechanism may change a force applied by the actuator mechanism itself to support the grill based on the identified physique of the pedestrian.

A colliding part (such as a leg, an abdominal part, a breast, or the head) of the pedestrian varies depending on the physique of the pedestrian. Further, a desired magnitude of the force to support the grille changes depending on the colliding part. For this reason, the force to support the grille is changed based on the physique of the pedestrian in order to achieve further suitable protection of the pedestrian.

In the above-described structure, the actuator mechanism may be disposed behind a central portion, in a vehicle width direction, of the grille.

The pedestrian may often bump against the grille in the vicinity of the central portion in the vehicle width direction. When the actuator mechanism capable of changing its supporting force is positioned in the vicinity of the central portion in the vehicle width direction, the force to support the grill on a site of collision with the pedestrian (i.e., on the central portion in the vehicle width direction of the grille) can be maintained at a magnitude established by the actuator mechanism, which can ensure further suitable protection of the pedestrian.

In another aspect, the actuator mechanism may be disposed behind an end portion, in the vehicle width direction, of the grille.

As described above, the pedestrian may often bump against the grille in the vicinity of the central portion in the vehicle width direction of the grille. Then, avoiding placement of the actuator mechanism in the vicinity of the central portion, the actuator mechanism which is rigid and stiff is disposed in a region close to the end portion of the grille, which causes the central portion of the grille to become suitably deformed at the time of a collision, and thus allows the grille to absorb energy of the collision.

In another aspect, the pedestrian protection apparatus may further include a hood extending from a position adjoined to the top end of the grille along a substantially horizontal direction, and a pop-up hood mechanism which is operatively interlocked with forward movement of the grille and configured to interlockingly lift the hood upward.

According to the above structure, a difference in height between the top end of the grille and a top surface of the hood can be reduced even after the grille is moved to an erect position, which can, in turn, contribute to reduction in the load exerted on the pedestrian falling to a hood side.

In the above structure, the pop-up hood mechanism may upwardly lift the hood to a height equal to that of the top end of the grille having been moved forward.

According to the above structure, the difference in height between the top end of the grill and the top surface of the hood can be almost eliminated, and the load exerted on the pedestrian falling to the hood side can be accordingly reduced.

In another aspect, the pop-up hood mechanism may upwardly lift the hood simultaneously with or subsequently to start of movement of the upper end portion in the grille.

The above structure allows the grille, which is apt to collide with the pedestrian earlier than the hood, to move prior to or simultaneously with the hood. Therefore, the above structure can protect the pedestrian with a higher degree of reliability.

In another aspect, the actuator mechanism may include a link mechanism in which three arms are link connected to each other so as to form a triangle, the three arms consisting of a first arm extending behind the grille from a region close to the lower end of the grille to a region close to the top end of the grille, a second arm connected to a lower end of the first arm and extending along a vehicle longitudinal direction, and a third arm connected to both an upper end of the first arm and a rear end of the second arm and configured to be extendable for changing an angle of inclination of the first arm.

According to the above structure, because there is no need to install a component to be extended along the vehicle longitudinal direction, dimensions of the actuator mechanism can be reduced in the vehicle longitudinal direction, while a degree of flexibility in installation of the actuator mechanism can be increased.

According to the pedestrian protection apparatus disclosed herein, the amount of protrusion of the grille from the front end of the vehicle can become smaller than that of a grill according to the conventional technique in which the entire grille is translated forward. In addition, because the grille can be shifted to the erect position, the colliding part of the pedestrian becomes substantially parallel to the grille, which allows the pedestrian to make contact with a broader area on the grille, and thus allows mitigation of local concentration of the load. As a result, it can be ensured that the pedestrian is protected with a higher degree of reliability.

BRIEF DESCRIPTION OF DRAWINGS

Embodiments of the present disclosure will be described based on the following figures, wherein.

DESCRIPTION OF EMBODIMENTS

Figure 1:
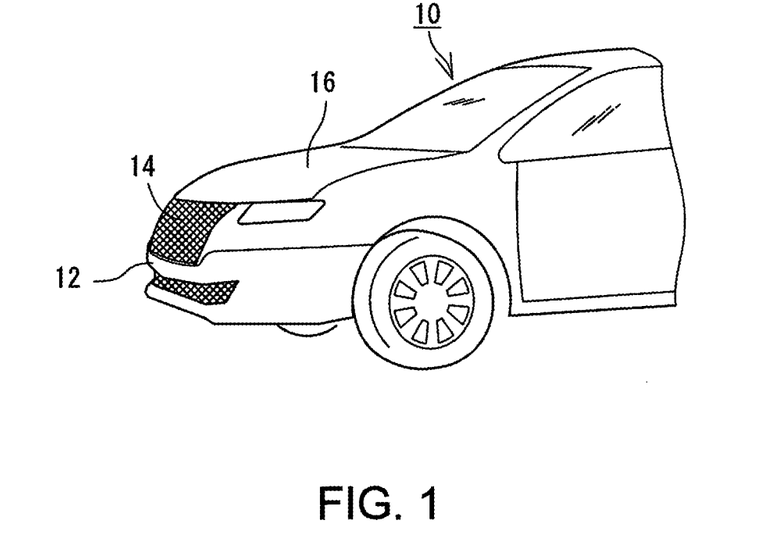
FIG. 1 is a perspective view of a front portion of a vehicle equipped with a pedestrian protection apparatus.
Figure 2:
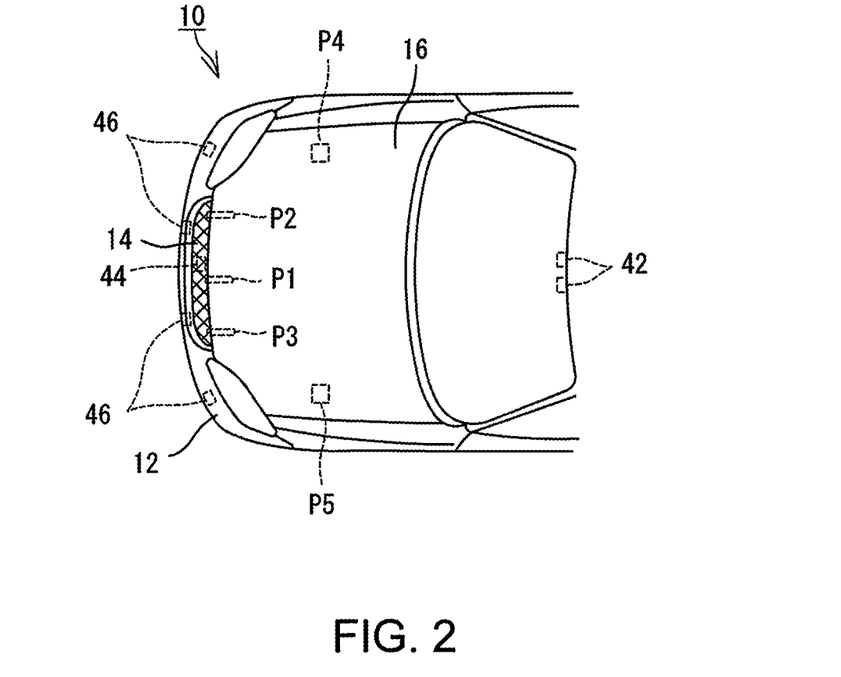
FIG. 2 is a plan view of the front portion of the vehicle equipped with the pedestrian protection apparatus.
Figure 3:
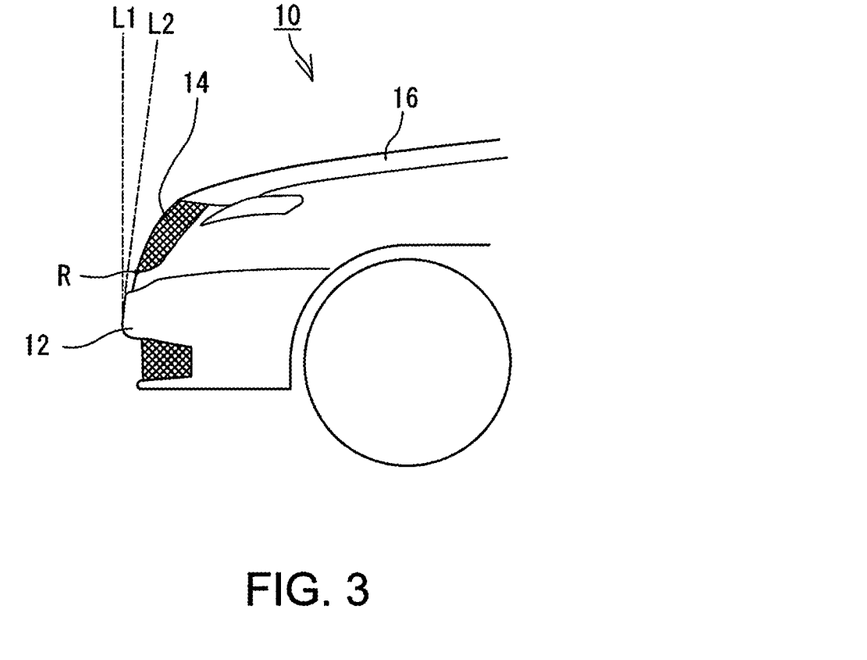
FIG. 3 is a side view of the front portion of the vehicle equipped with the pedestrian protection apparatus.

Hereinafter, the structure of a pedestrian protection apparatus will be described with reference to drawings. FIG. 1 is a perspective view of a front portion of a vehicle 10 on which a pedestrian protection apparatus is mounted. FIG. 2 is a schematic plan view of the vehicle 10, and FIG. 3 is a schematic side view of the vehicle 10. A bumper 12 extending along a vehicle width direction is disposed on the front portion of the vehicle 10. The bumper 12 is composed of a resin or the like. In this example, the bumper 12 is protruded so as to be in front of the surrounding components, and a front end surface of the bumper 12 is slightly inclined with an upper portion of the bumper 12 being shifted rearward. Line L1 indicated in FIG. 3 represents a foremost extremity of the bumper 12, and line L2 represents an upward extension line of the front end surface of the bumper 12.

A grille 14 is disposed above the bumper 12. The grille 14 has a plurality of openings through which air is introduced to cool a radiator. In this example, the grille 14 is inclined while rising toward a rear portion, and a top end of the grille 14 extends to a front end of a bonnet hood (hereinafter abbreviated as "hood") 16. In other words, the grille 14 and the hood 16 are arranged so as to adjoin each other in this example. The grille 14 is attached to the vehicle in such a manner that an upper end portion of the grille 14 is able to advance forward. More specifically, the grille 14 is fixed to the vehicle at a location close to a lower end of the grille 14 (i.e. a location lower that the upper end portion of the grille 14), and configured to be swingable about a support shaft R extending along a vehicle width direction, for changing an angle of inclination of the grille 14. In addition, an actuator mechanism (not illustrated) for swinging the grille 14 is installed immediately behind the grill 14. The actuator mechanism will be explained in detail further below.

The hood 16 extending along a substantially horizontal direction is configured to cover an upper opening of a power unit chamber (also referred to as an engine compartment). The hood 16 can be opened and closed in accordance with an instruction from a user. As will be described below, the food 16 is arranged in a state operatively interlocked with movement (swinging) of the grille 14, and is configured to be upwardly popped up interlockingly responding to the movement of the grille 14. A pop-up mechanism (not illustrated, and hereinafter abbreviated as "PU mechanism") for upwardly lifting the hood 16 is installed below the hood 16.

Figure 4:
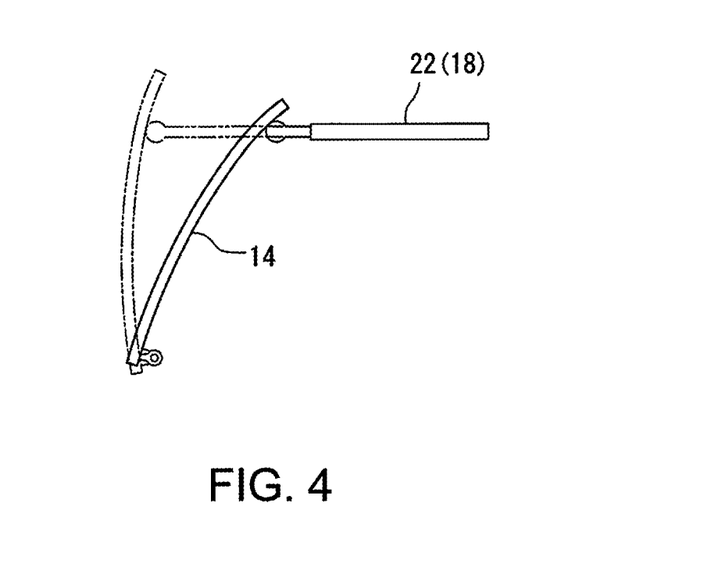
FIG. 4 is a diagram showing an example of an actuator mechanism.

It is essential for the actuator mechanism to be capable of moving the grille 14 in such a manner that the forward advancing amount of the upper end portion of the grille 14 becomes greater than that of the lower end portion of the grille 14. Other than this capability, there is no specific limitation on the structure of the actuator mechanism. Therefore, the actuator mechanism 18 may be configured, for example, to push a portion of the grille 14 in the vicinity of its top end by means of an extendable rod 22, as shown in FIG. 4.

Figure 5A:
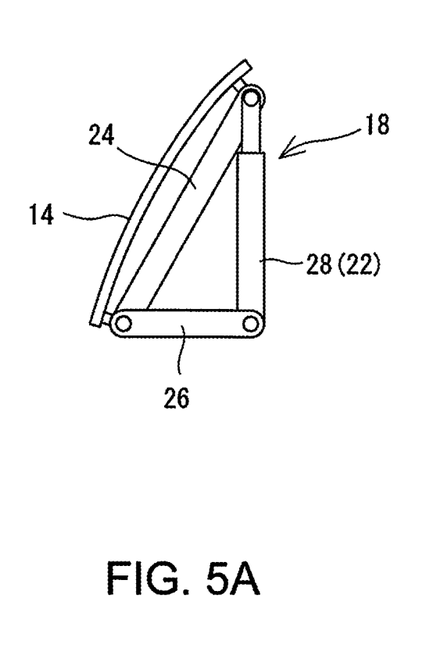
FIG. 5A is a diagram showing another example of the actuator mechanism.
Figure 5B:
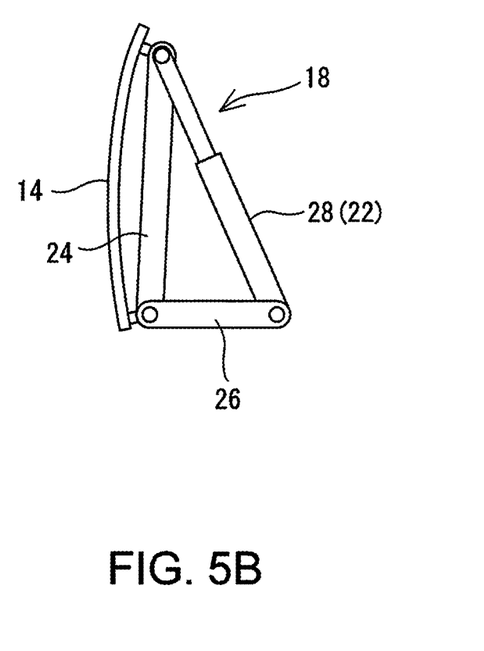
FIG. 5B is a diagram showing a further example of the actuator mechanism.

As an alternative mechanism, the actuator mechanism 18 may be a link mechanism in which three arms 24, 26, and 28 are mutually link connected as shown in FIGS. 5A and 5B. In this case, the link mechanism includes a first arm 24 joined to the grille 14 at both positions close to lower and upper ends of the grille 14, a second arm 26 link connected to a lower end of the first arm 24, and a third arm 28 link connected to an upper end of the first arm 24 and a rear end of the second arm 26. The third arm 28 is the extendable rod 22 capable of extending along an axial direction thereof to change its entire length in the axial direction. When the third arm 28 (extendable rod 22) is extended, the shape of the link mechanism is changed, which causes the grille 14 to be shifted from an inclined position (the position shown in FIG. 5A), where the grille 14 is inclined so as to become higher at its rear portion, to the erect position (the position shown in FIG. 5B), where the grille 14 is erected substantially vertically. During the shifting, the upper end portion of the grille 14 is moved forward by an amount greater than that of the lower end portion.

The above-described link mechanism can be designed as a separate single assembly independent of other components, and thus can be easily handled and installed in a manufacturing process of the vehicle 10. Further, because the link mechanism includes no components which should be extended along a vehicle longitudinal direction, a dimension of the link mechanism can be reduced in the vehicle longitudinal direction.

Similar to the actuator mechanism 18, the PU mechanism is not limited to any specific structure as long as the PU mechanism is able to lift the hood 16 upward. For example, the PU mechanism may be configured to upwardly lift the hood 16 using a single extendable rod, or using a link mechanism including the extendable rod.

Figure 6A:
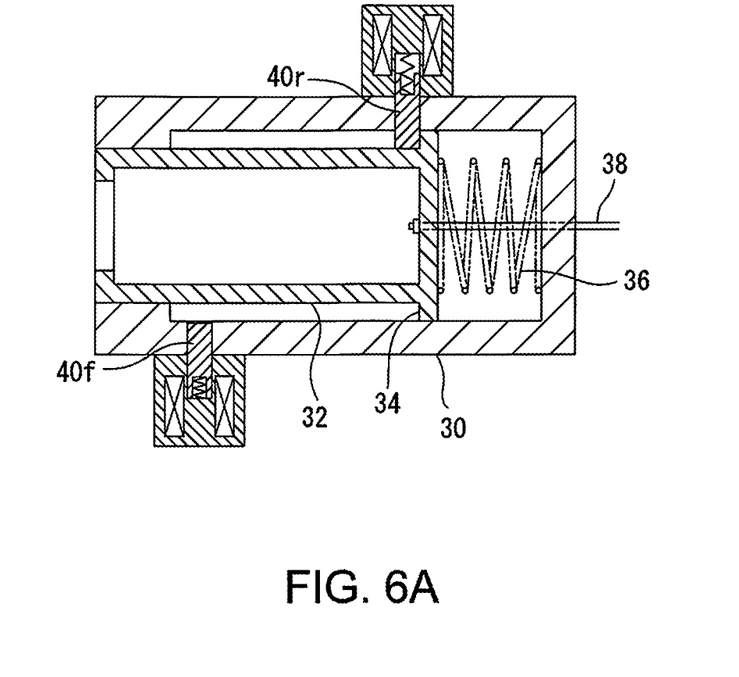
FIG. 6A is a diagram showing an example of an extendable rod.
Figure 6B:
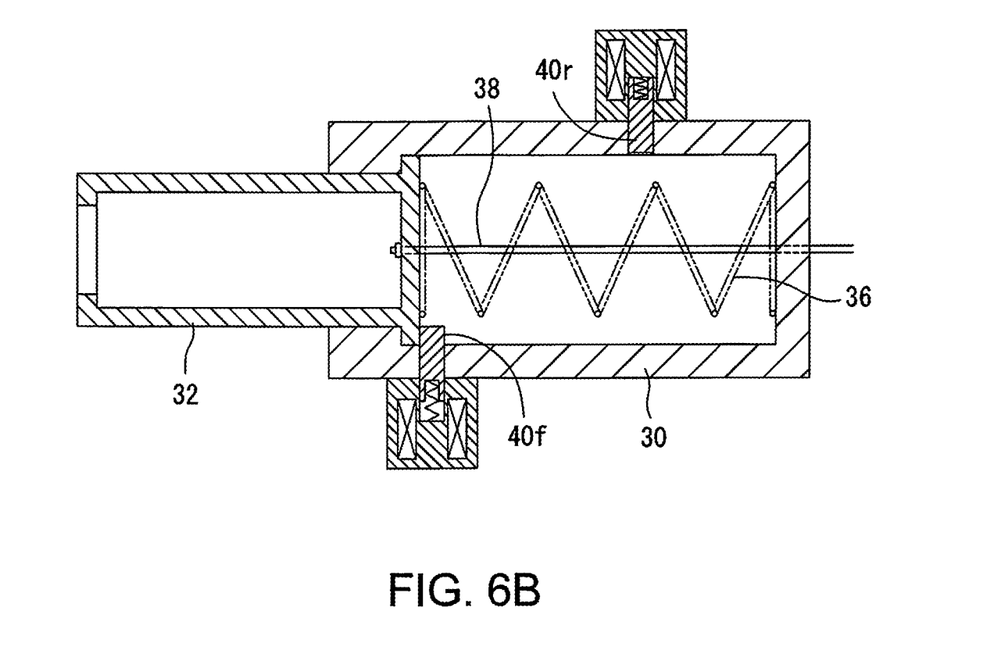
FIG. 6B is a diagram showing an extended state of the extendable rod.

In addition, the extendable rods used for the actuator mechanism 18 and the PU mechanism are not limited to any specific structure, and may be, for example, a rod which is extended and retreated by a combination of a motor and a screw driven to rotate by the motor. Further, in another form, the extendable rod may be designed to be extended and retreated by means of a hydraulic cylinder or a pneumatic cylinder. In a further form, the extendable rod may be configured to use a solenoid and a biasing force of a spring. FIGS. 6A and 6B illustrate an example of the extendable rod. In the illustrated example, a mechanism for extending and retreating the extendable rod includes a hollow outer cylinder 30 and a retractable cylinder 32 which can be advanced and retracted within the outer cylinder 30. The retractable cylinder 32 or a rod (not illustrated) joined to the retractable cylinder 32 functions as the extendable rod. The retractable cylinder 32 is biased in an advancing direction by a spring 36. In addition, a flange 34 protruded outward is arranged on a rear end of the retractable cylinder 32. Further, the retractable cylinder 32 is connected to a take-up wire which may be taken up by means of a motor (not illustrated) or the like.

The circumference of the outer cylinder 30 is equipped with two plungers, namely forward and rear plungers 40*f* and 40*r*, which are retractable along a radial direction of the outer cylinder 30, and are spaced from each other along an axial direction of the outer cylinder 30. Each of the plungers 40*f* and 40*r* can be retracted along the radial direction by electromagnetic action of the solenoid. Then, when the solenoids are de-energized, each of the plungers 40*f* and 40*r* is advanced along the radial direction by a biasing force of a spring.

When the rear plunger 40*r* is advanced along the radial direction under a condition that the retractable cylinder 32 is retracted, the rear plunger 40*r* is engaged with the flange 34, which prevents the retractable cylinder 32 from advancing. It should be noted that under the above condition, the forward plunger 40*f* is retracted as shown in FIG. 6A. In the retracted state of the forward plunger 40*f*, when the rear plunger 40*r* is radially retracted by the electromagnetic action of the solenoid, engagement between the rear plunger 40*r* and the flange 34 is released, which allows the retractable cylinder 32 to be advanced by the biasing force of the spring 36. In a state where the retractable cylinder 32 is fully advanced, the forward plunger 40*f* is advanced along the radial direction by the electromagnetic action of the solenoid, which causes the rear end of the retractable cylinder 32 to engage with the forward plunger 40*f* as shown in FIG. 6B. This prevents retracting movement of the retractable cylinder 32. The retractable cylinder 32 which has been advanced can be retracted by retracting both the forward plunger 40*f* and the rearward plunger 40*r* along the radial direction, and subsequently, in the retracted state of the plungers 40*f* and 40*r*, taking up the take-up wire 38.

It is necessary for the above-described actuator mechanism 18 to have a function of swinging the grille 14 to forwardly move the upper end portion of the grille 14, while there is no limitation on an installation location of the actuator mechanism 18 or the number of actuator mechanisms 18 to be installed. Therefore, the actuator mechanism 18 may be disposed on a central portion in the vehicle width direction of the grille 14 (the position P1 shown in FIG. 2), or may be disposed, as another form, on an end portion in the vehicle width direction of the grille 14 (the position P2 or P3 shown in FIG. 2). One actuator mechanism 18, or two or more actuator mechanisms 18 may be installed. Similarly, there is no limitation on an installation location of the PU mechanism or the number of PU mechanisms to be installed, as long as the PU mechanism is capable of lifting the hood 16 upward. It should be noted that positions P4 and P5 shown in FIG. 2 indicate placement locations of the PU mechanism merely by way of illustration.

Figure 7:
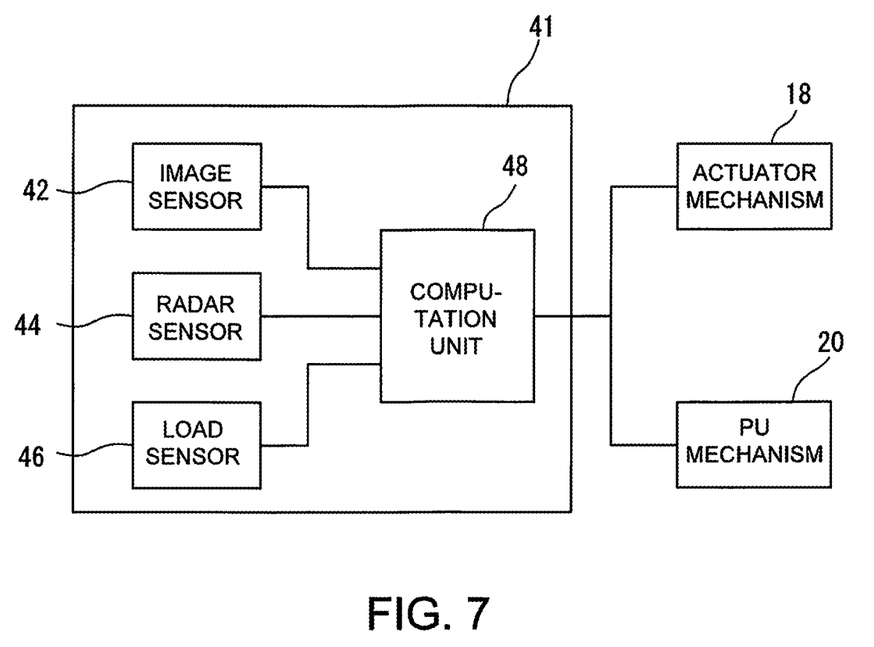
FIG. 7 is a block diagram showing components of a collision prediction unit.

The vehicle 10 further includes a collision prediction unit 41 which predicts a collision of the vehicle 10 with a pedestrian 100. FIG. 7 is a block diagram showing components of the collision prediction unit 41. The collision prediction unit 41 includes a plurality of sensors 42, 44, and 46 for detecting conditions of the vehicle 10 and conditions of vehicle surroundings, and a computation unit 48 for predicting, based on results of detection in the sensors 42, 44, and 46, whether or not a collision will occur. In a physical aspect, the computation unit 48 including a central processing unit (CPU) for executing computation processing and a memory for storing various types of data and programs is implemented, for example, by an electronic control unit (ECU) mounted on the vehicle 10.

Although there is no specific limitation on the type and the number of sensors for detecting conditions of the vehicle 10 and vehicle surroundings, the sensors used for predicting a collision are provided, in this example, including an image sensor 42, a radar sensor 44, and a load sensor 46. The image sensor 42 is configured to capture images of surroundings of the vehicle 10, and may be, for example, a CCD camera or the like. In light of acquisition of parallax information, the image sensor 42 may be provided in a stereophonic arrangement in which two image sensors 42 are placed at a distance from each other in a stereoscopic width along the vehicle width direction. Based on image data acquired from the two image sensors 42, a distance from an object, and a relative speed/direction of the object with respect to the vehicle 10 are obtained, for example, by means of the principle of triangulation. The image sensors 42 are disposed, for example, on locations close to a front mirror (see FIG. 2).

The radar sensor 44 emits a detection wave, and detects, based on a reflection wave which is, after impinging onto an object, reflected from the object, the distance from the object, and the relative speed/direction of the object with respect to the vehicle 10. The detection wave emitted by the radar sensor 44 may be a light wave (such as, for example, a laser wave), a radio wave (such as, for example, a millimetric wave), a sound wave (such as, for example, an ultrasonic wave), or a combination thereof. The radar sensor 44 may be installed, for example, behind the grille 14 (see FIG. 2) or at other locations.

The load sensor 46 is configured to detect a collision load on the bumper 12. Such load sensors 46 may be embedded, for example, at a predetermined interval in the bumper 12 (see FIG. 2). In place of or in addition to the load sensors 46, an acceleration sensor may be installed in order to calculate the collision load based on an acceleration detected by the acceleration sensor.

The computation unit 48 is configured to predict and detect a collision of the vehicle 10 with the pedestrian 100 based on information detected by the sensors 42, 44, and 46. For example, the computation unit 48 determines the presence or absence of a pedestrian in the vicinity of the vehicle 10 based on the results of detection in the image sensors 42 and the radar sensor 44, and calculates, when the pedestrian is determined to be present, a distance from the pedestrian and a relative speed and a relative direction of the pedestrian with respect to the vehicle 10. Following this, the computation unit 48 determines, based on the calculated distance, relative speed, and relative direction, whether or not the collision with the pedestrian is avoidable. When it is determined in the computation unit 48 that the collision with the pedestrian 100 is unavoidable, the computation unit 48 activates the actuator mechanism 18 and the PU mechanism 20 in order to lessen the load on the pedestrian 100. After the activation of the actuator mechanism 18 and the PU mechanism 20, the computation unit 48 determines, based on a result of detection from the load sensor 46, whether or not the collision with the pedestrian 100 has actually occurred.

Figure 8:
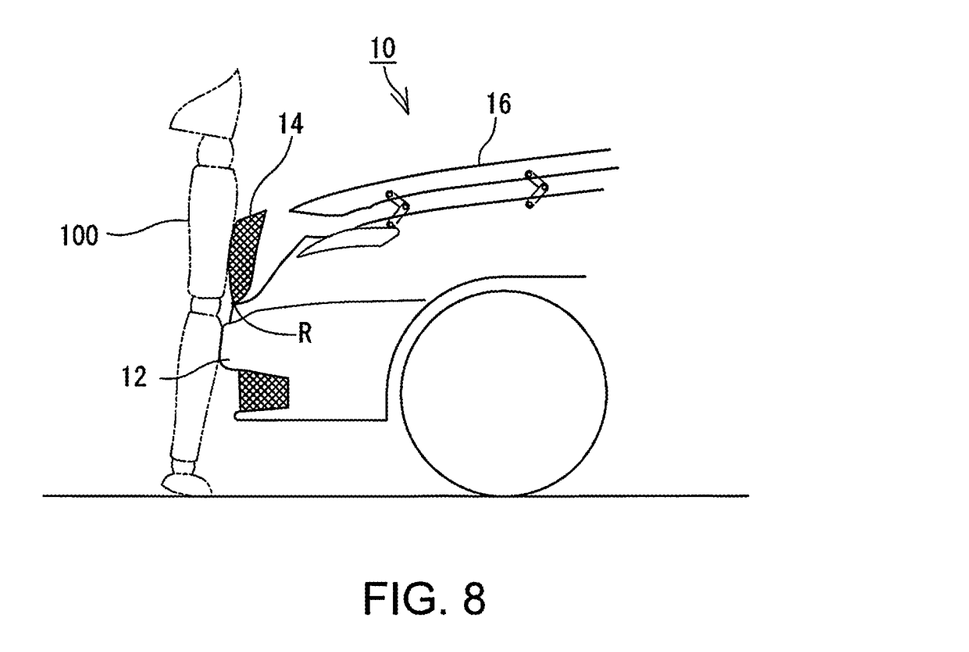
FIG. 8 is a side view showing a situation in which a grille is swung while a hood is popped up.

FIG. 8 is a side view showing a condition in which the grille 14 is swung and the hood 16 is popped up by the actuator mechanism 18 and the PU mechanism 20, respectively. As shown in FIG. 8, when the collision with the pedestrian 100 is predicted to occur, the computation unit 48 activates the actuator mechanism 18 for causing the grille 14 to be swung with the top end of the grille 14 being shifted forward. Because the grille 14 is swung about the support shaft R arranged on the location close to the lower end of the grille 14, the lower end of the grille 14 undergoes almost no movement. On the other hand, the entire positioning of the grille 14 is changed from the inclined position where the grille 14 extends above while shifting rearward to the erect position where the grille 14 is erected substantially upright. In other words, the grille 14 is advanced to the same position as the front end surface of the bumper 12 in the front and rear direction, and set to the position substantially parallel to a leg of the pedestrian 100. As a result, the leg of the pedestrian 100 can be supported by the front end surface of the bumper 12 and also by almost the entire surface of the grill 14. That is, it becomes possible to support the leg of the pedestrian 100 over a broader area. In this way, a local increase in input to the lower half of the body of the pedestrian 100 can be effectively prevented.

A swung angle of the grille 14 desirable for effective prevention varies depending on the shapes of the grille 14 and the bumper 12, the physique of the pedestrian 100 to be collided with, and other factors, while the grille 14 may be swung at least within a range where the grille 14 does not exceed the front most end of the vehicle 10. Therefore, in the example shown in FIG. 3, the grille 14 may be swung within a range not exceeding a line L1. With this configuration, the entire length of the vehicle 10 is not increased even after the grille 14 is swung to support the pedestrian 100. Conversely, if the grille 14 were moved further forward than the front most end of the vehicle 10 (i.e. if the entire length of the vehicle 10 were increased) as a result of swinging the grille 14, the forward movement of the grille 14 would create a risk that the grille 14 could collide with the pedestrian 100 who otherwise would not have been struck, i.e. an unnecessary collision could occur. However, when the grille 14 is swung, as implemented in the example of this disclosure, within the range where the swing of the grille 14 does not accompany an increase in the entire length of the vehicle 10, the unnecessary collision can be reliably prevented.

Meanwhile, when the front end surface of the bumper 12 is inclined or curved along the vertical direction, the grille 14 may be swung within a range not exceeding an extension line which is upwardly extended along the front end surface of the bumper 12. Accordingly, in the example of FIG. 3, the grille 14 is swung within a range not exceeding a line L2. The above configuration allows the front end surface of the bumper 12 and the front surface of the grille 14 to cooperatively support the pedestrian 100.

Further, in this example, when the grille 14 is swung as shown in FIG. 8, the hood 16 is upwardly popped up interlockingly responding to the forward movement of the upper end portion of the grille 14 (responding to the swing of the grille 14). With this configuration, a difference in height between the top end of the grille 14 and the top surface of the hood 16 can be reduced, which can lead to appropriate protection against the pedestrian 100 falling on a hood 16 side. Specifically, when the grille 14 in the inclined position is swung to an extent that the grille 14 takes the substantially vertical erect position, the top end of the grille 14 is shifted upward, resulting in creation of a difference in height from the top surface of the hood 16. As the height difference becomes greater, the load applied to the pedestrian 100 falling onto the hood 16 side is increased. Further, if the height difference is present between the top end of the grille 14 and the hood 16, the top end of the grille 14 would be thrust against the body of the pedestrian 100, to thereby apply a local load onto the pedestrian 100. To prevent the application of the local load, in this example, when the grille 14 is swung, the hood 16 is interlockingly popped up in response to the swing of the grille 14. In this case, although a popped-up amount of the hood 16 is not specifically limited, the hood 16 may be popped up to a height substantially equal to a height of the top end of the grille 14 placed in the erect position.

Figure 9:
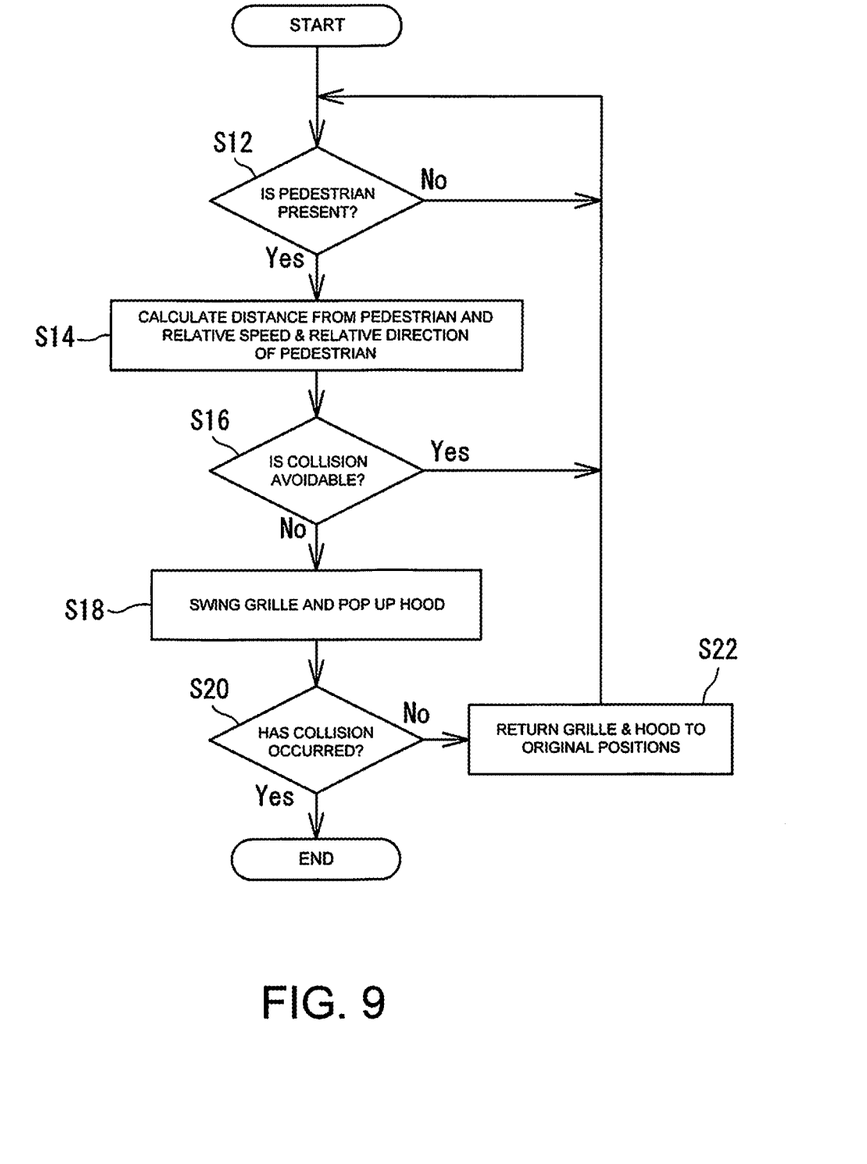
FIG. 9 is a flowchart showing a flow of steps in a pedestrian protection process.

FIG. 9 is a flowchart showing a flow of steps in a pedestrian protection process. The computation unit 48 determines, based on the detected values from the sensors 42, 44, and 46, the presence or absence of the pedestrian 100 (step S12). When the pedestrian 100 is determined to be absent, the process returns to step S12. On the other hand, when the pedestrian 100 is determined to be present, the computation unit 48 further calculates, based on the detected values from the sensors 42, 44, and 46, the distance from the pedestrian 100, the relative speed, and the relative direction of the pedestrian 100 (step S14). Then, the computation unit 48 determines, based on a result of the calculation, whether or not a collision with the pedestrian 100 is avoidable (step S16). When the collision is determined to be avoidable, the computation unit 48 returns to step S12.

On the other hand, when the collision is determined to be unavoidable, the computation unit 48 operates the actuator mechanism 18 to swing the grille 14 forward and operates the PU mechanism 20 to pop up the hood 16 upward (step S18). It should be noted that in step S18, the operation to swing the grille 14 and the operation to pop up the hood 16 upward are performed at almost the same time. However, the hood 16 may be popped up after the grille 14 is swung. Because a pedestrian is struck by the grille 14 earlier than the hood 16, more reliable protection of the pedestrian can be ensured by making the operation to swing the grille 14 occur first. Then, the computation unit 48 determines, based on a result of detection by the load sensor 46, whether or not the collision with the pedestrian 100 has actually occurred (step S20). When it is found, as a result of the determination, that the collision has occurred, a series of process steps are finished. On the other hand, when the collision is not determined to have occurred, the computation unit 48 causes the grille 14 having been swung and the hood 16 having been popped up to be restored to their original positions (step S22), and returns to step S12 to repeat processing from step S12 onward.

As can be understood from the above explanation, when a collision with the pedestrian 100 is predicted, the grille 14 is swung using a portion close to the lower end of the grille 14 as the center of swing. As a result, in addition to the bumper 12, the grille 14 is also able to support the pedestrian 100, which can prevent local concentration of the collision load, and in turn contribute to reduction in the load exerted on the pedestrian 100. Further, because the hood 16 is popped up due to being interlocked with the swing of the grille 14, the difference in height between the top end of the grille 14 and the top surface of the hood 16 can be minimized.

It should be noted that in the above, the pedestrian 100 is assumed to be an adult, and the grille 14 has been explained on the precondition that a leg of the pedestrian 100 is supported by the grille 14. However, the pedestrian 100 who collides with the vehicle 10 can be of various physiques. For this reason, processing details of the protection process may be changed based on a physique of the pedestrian 100.

Figure 10:
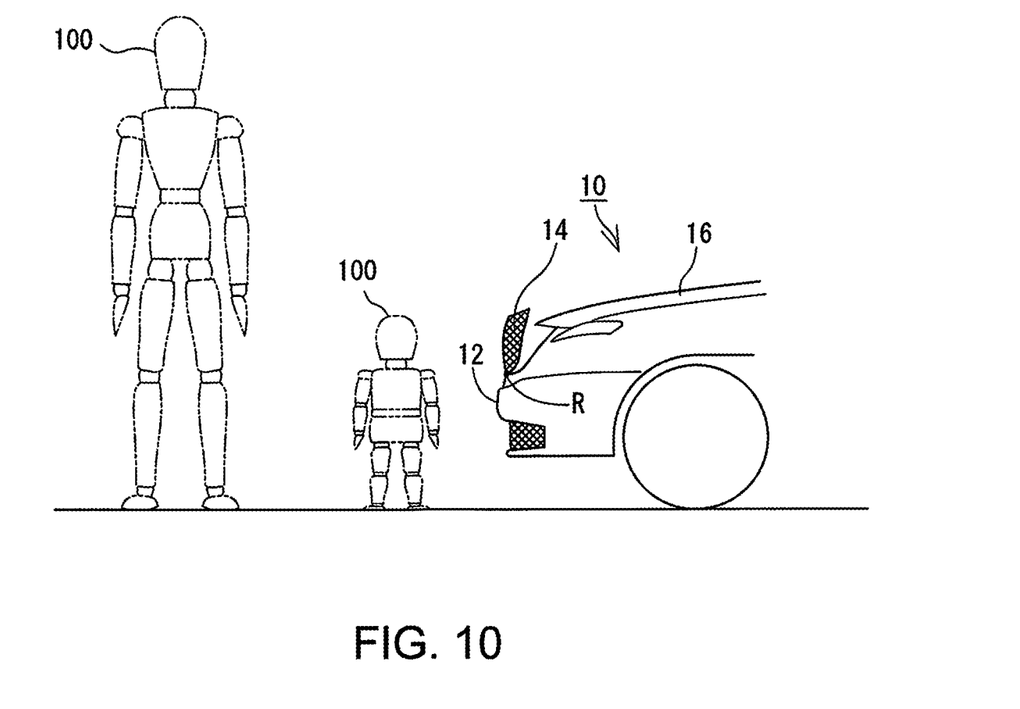
FIG. 10 is a diagram for explaining a difference in physique between pedestrians.

Specifically, the pedestrian 100 may be an adult, a child or infant, etc. Here, as shown in FIG. 10, if the pedestrian 100 is an adult, the height of the grille 14 in the vehicle 10 would typically correspond to that of the leg of the pedestrian 100. On the other hand, if the pedestrian 100 is a child, infant or other person of small stature, the height of the grille 14 in the vehicle would typically correspond to that of a body part from the head to the midriff of the pedestrian 100.

In a case of a collision with the leg, it is desired that the leg be firmly supported by the grille 14 to allow the pedestrian 100 to easily fall toward the hood 16 side. However, in a collision with the body part from the head to the midriff, which is weaker than the leg, it is desired that the grille 14 be low in stiffness, and softer, for minimizing a reaction force exerted from the grille 14 onto the body part from the head to the midriff.

Figure 11A:
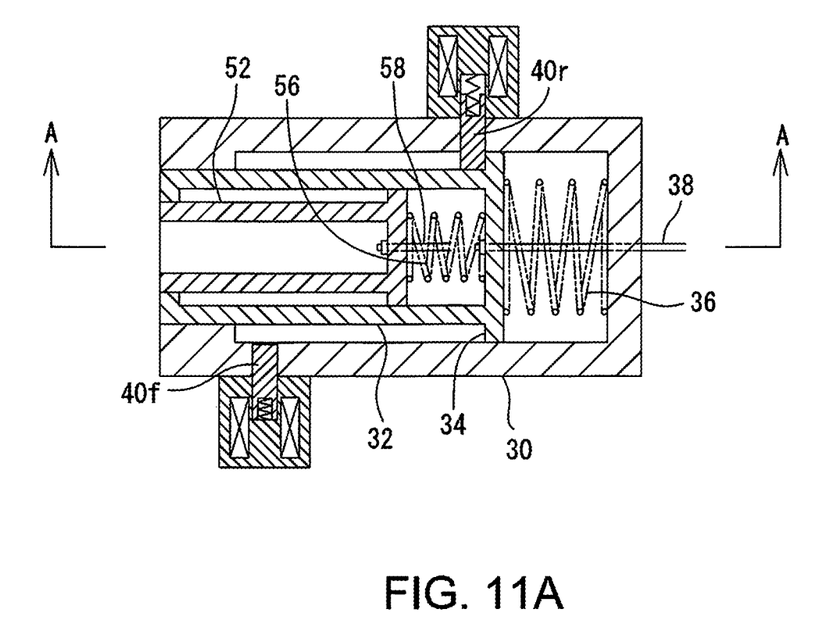
FIG. 11A is a diagram showing another example of the extendable rod.
Figure 11B:
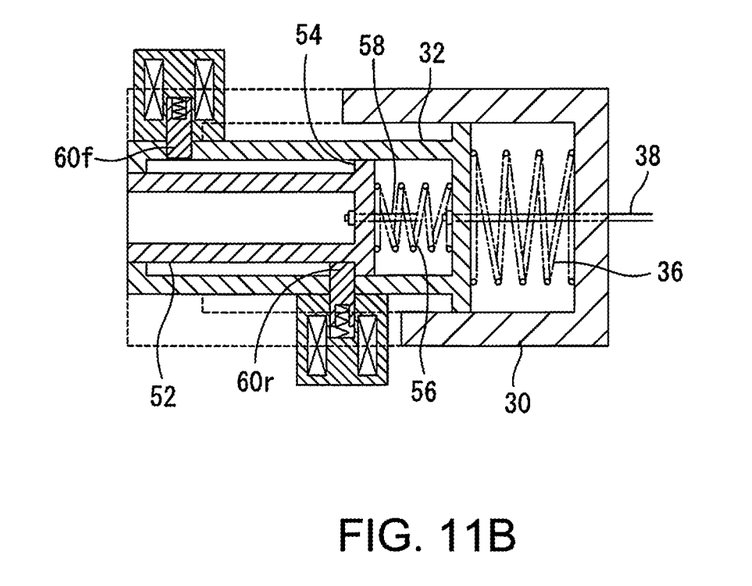
FIG. 11B is a cross section view taken along line A-A indicated in FIG. 11A.

For this reason, the actuator mechanism 18 may be provided with a function of switching forces to support the grille 14 based on the physique (stature) of the pedestrian 100. Specifically, the forces to support the grille 14 are switched so as to become greater when the pedestrian 100 is of a large physique and become smaller when the pedestrian 100 is of a small physique. Various mechanisms for switching the support forces may be implemented. For example, an air spring whose load rate can be changed by means of air pressure, a hydraulic absorber whose damping property can be changed by means of oil pressure, etc. may be used as the mechanism for switching the support forces. Further, in another form, a mechanism may be employed, as shown in FIGS. 11A and 11B, in which two retractable cylinders 32 and 52 having different levels of stiffness are incorporated as the retractable rod used for the actuator mechanism 18. FIG. 11A is a cross section view showing an example of the extendable rod, and FIG. 11B is a cross section view taken along line A-A indicated in FIG. 11A. The extendable rod 22 shown in FIGS. 11A and 11B looks similar to the extendable rod shown in FIGS. 6A and 6B, while there is a difference in that the extendable rod 22 shown in FIGS. 11A and 11B further includes the inner retractable cylinder 52 disposed inside the retractable cylinder 32. The inner retractable cylinder 52 is lower in stiffness than the retractable cylinder 32, and is thus apt to become crushed. The inner retractable cylinder 52 is biased in an advancing direction by a spring 56. In addition, the inner retractable cylinder 52 is connected to a take-up wire 58 which can be taken up by means of a motor (not illustrated) or other components.

The circumference of the inner retractable cylinder 52 is provided with two plungers 60$f$ and 60$r$ which are retractable along a radial direction of the inner retractable cylinder 52 and arranged to be spaced from each other in an axial direction of the inner retractable cylinder 52. When one of the two plungers 60$f$ and 60$r$, i.e. the rear plunger 60$r$ is retracted along the radial direction, the inner retractable cylinder 52 is advanced along the axial direction relative to the retractable cylinder 32. In this advanced state of the inner retractable cylinder 52, the front plunger 60$f$ is plunged inward in the radial direction, which prevents a retreat of the inner retractable cylinder 52. Then, the retracted position and the plunged position are exchanged between the front and rear plungers 60$f$ and 60$r$. In this state, the inner retractable cylinder 52 can be retreated relative to the retractable cylinder 32 by taking up the take-up wire 38.

Figure 12A:
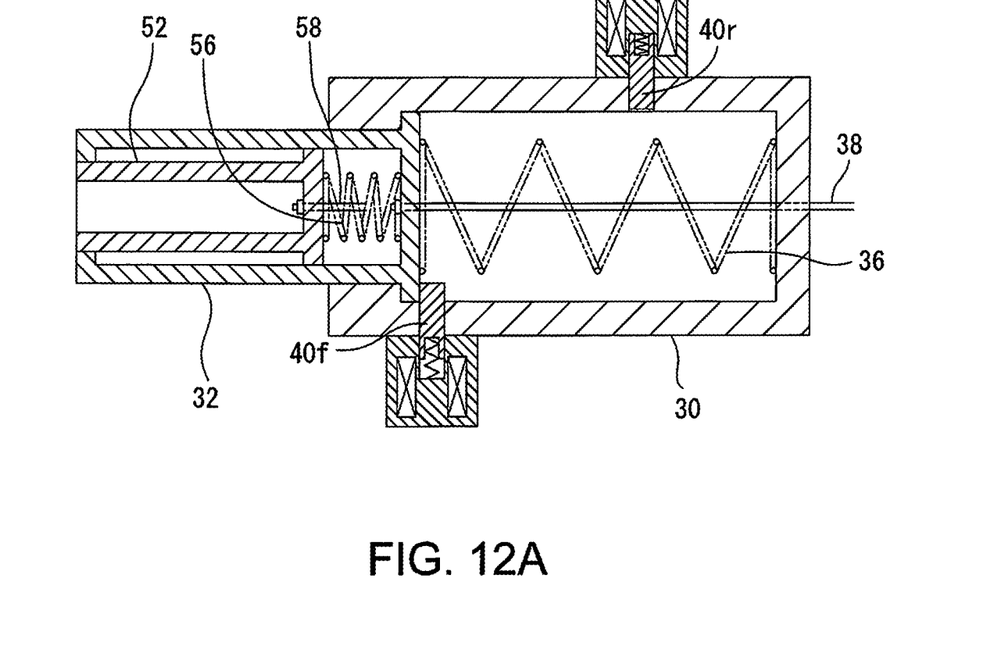
FIG. 12A is a diagram showing a state where both a retractable cylinder and an inner retractable cylinder are advanced.

In the thus-configured extendable rod, the force to support the grille 14 can be increased by retracting, as shown in FIG. 12A, the rear plunger 40r on the outer side for allowing the retractable cylinder 32 to be advanced along the axial direction together with the inner retractable cylinder 52. In this way, the grille 14 is supported by both the retractable cylinder 32 and the inner retractable cylinder 52, leading to an increase in the force to support the grille 14.

Figure 12B:
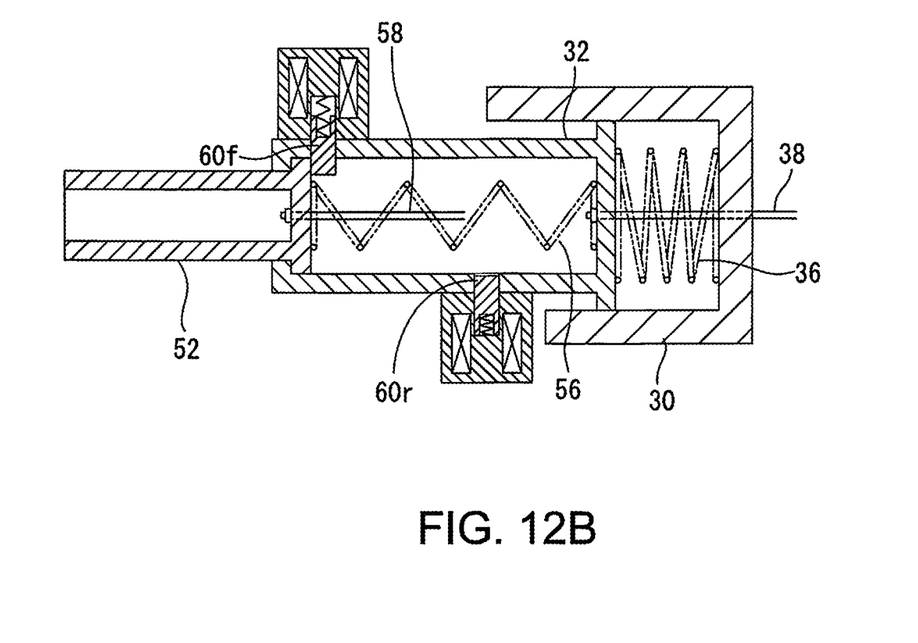
FIG. 12B is a diagram showing a state where only the inner retractable cylinder is advanced.

On the other hand, the force to support the grille 14 can be reduced by retracting, as shown in FIG. 12B, the rear plunger 60r on an inner side along the radial direction for allowing only the inner retractable cylinder 52 to be advanced along the axial direction. In this way, the grille 14 is supported only by the inner retractable cylinder 52, leading to a decrease in the reaction force transferred from the grille 14 to the pedestrian 100.

Figure 13:
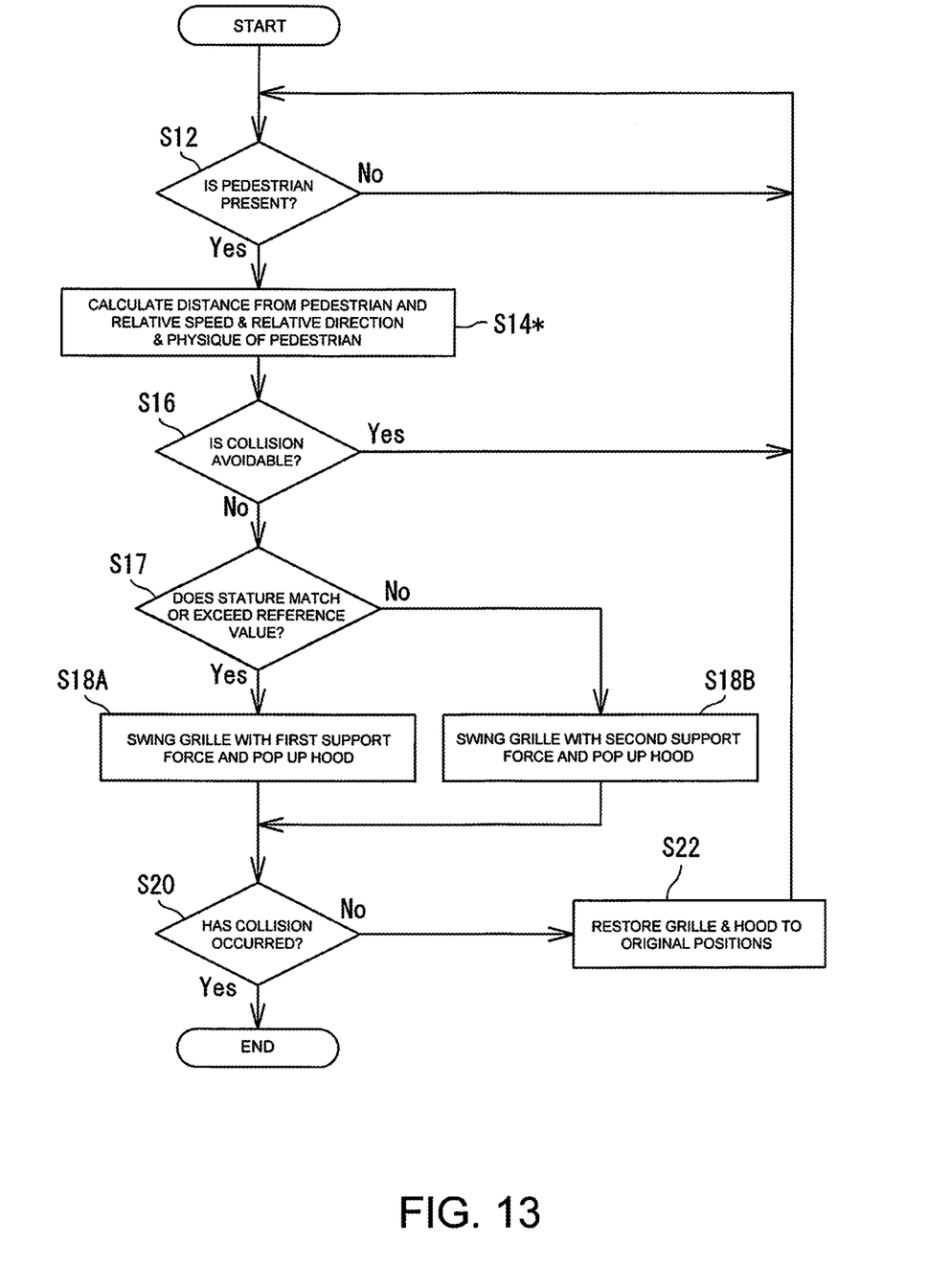
FIG. 13 is a flowchart showing another flow of the steps in the pedestrian protection process.

FIG. 13 is a flowchart showing a flow of steps in another pedestrian protection process performed when the support forces are switched based on the physique of the pedestrian 100. In this process, the computation unit 48 determines, based on the detected values from the sensors 42, 44, and 46, the presence or absence of the pedestrian 100 (step S12). When the pedestrian 100 is present, the computation unit 48 calculates, based on the detected values from the sensors 42, 44, and 46, the distance from the pedestrian 100, the relative speed, and the relative direction, and further calculates a physique (stature) of the pedestrian 100 (step S14*). Next, the computation unit 48 determines, based on the results of the calculations, whether a collision with the pedestrian 100 is avoidable or unavoidable (step S16). When the collision is determined to be unavoidable, the computation unit 48 causes the grille 14 to be swung and the hood 16 to be popped up (step S18A or S18B). Here, before causing a swing of the grille 14, the computation unit 48 determines whether or not the stature of the pedestrian 100 is greater than or equal to a reference value (step S17). When the stature of the pedestrian 100 is found, as a result of the determination, to be of the reference value or greater, the computation unit 48 further determines that the grille 14 will collide with the leg of the pedestrian 100, and accordingly causes the grille 14 to be swung under a condition of being supported with a first support force which is relatively greater (step S18A). In this case, because the pedestrian 100 is firmly supported at their leg by the grille 14, the pedestrian 100 can easily fall toward the hood 16 side while being supported continuously. Then, the falling of the pedestrian 100 onto the hood 16 side ensures that the head part and other parts of the pedestrian 100 can be received by the hood 16 having an excellent energy absorbing property.

On the other hand, when the stature of the pedestrian 100 is smaller than the reference value, the computation unit 100 determines that the grille 14 will collide with the body part from the head to midriff of the pedestrian 100, and accordingly causes the grille 14 to be swung under a condition of being supported with a second support force which is lower than the first support force (step S18B). In this case, the grille 14 is apt to become deformed or displaced through the collision with the pedestrian 100, which can lead to reduction in the reaction force acting on the pedestrian 100. In this way, it becomes possible to protect the weaker body part from the head to belly of the pedestrian 100 in a further suitable way.

After swinging the grille 14 and popping up the hood 16, the computation unit 100 determines whether or not the collision has actually occurred as in the case of the example shown in FIG. 9, and subsequently, if the collision has not occurred, returns the grille 14 and the hood 16 to their original positions (steps S20 and S22). As can be understood from the above description, the pedestrian 100 can be further suitably protected by switching the forces to support the grille 14 based on the physique of the pedestrian 100. It should be noted that while the example of switching between two levels of the forces to support the grille 14 has been described above, the forces to support the grille 14 may be varied in a multilevel manner in accordance with the physique of the pedestrian 100.

Meanwhile, to give a suitable shock absorbing property to the grille 14, the actuator mechanism 18 should be placed at a position close to the end portion of the grille 14, for example, at the position P2 or P3 shown in FIG. 2. This is because the pedestrian 100 will often collide with the grille 14 in a region around a width center of the grille 14. When the actuator mechanism 18 of rigid structure is placed in the vicinity of the end portion of the grille 14 rather than the region around the width center, a central portion of the grille 14 is allowed to become appropriately deformed, and accordingly absorb collision energy suitably.

However, in a case where the actuator mechanism 18 has the capability of changing its support force as described above, the actuator mechanism 18 may be placed at a position which is prone to collide with the pedestrian 100, that is, at the center P1 in the width direction. With this placement, the support force at a site of the collision with the pedestrian 100 (i.e. the central portion in the width direction of the grille 14) can be maintained at the magnitude established by the actuator mechanism 18, which can lead to further suitable protection of the pedestrian 100 in accordance with the physique of the pedestrian 100.

It is to be understood that the above explanation is presented by way of illustration, and the structure, geometries, and features of the pedestrian protection apparatus may be modified or changed as appropriate as long as the grille 14 can be moved, when a collision with the pedestrian 100 is predicted, in such a manner that the forward advancing amount of the upper end portion of the grille 14 is greater than the forward advancing amount of the lower end portion of the grille 14. For example, although the hood 16 is upwardly popped up interlockingly responding to the swing of the grille 14 in the above-described example, such an interlocked pop up function of the hood 16 may be omitted. The actuator mechanism 18 for the grille 14 and a swung amount of the grille 14 may be appropriately changed as needed. In the collision prediction unit 41, the types and the number of sensors may be changed as appropriate as long as the collision prediction unit 41 is able to predict a collision of the vehicle 10 with the pedestrian 100 using the sensors.

REFERENCE SIGNS LIST 10 vehicle; 12 bumper; 14 grille; 16 hood; 18 actuator mechanism; 20 PU mechanism; 22 extendable rod; 24 first arm; 26 second arm; 28 third arm; 30 outer cylinder; 32 retractable cylinder; 34 flange; 36, 56 spring; 38, 58 take-up wire; 40f, 60f forward plunger; 40r, 60r rear plunger; 41 collision prediction unit; 42 image sensor; 44 radar sensor; 46 load sensor; 48 computation unit; 52 inner retractable cylinder; 100 pedestrian.

The invention claimed is:

1. A pedestrian protection apparatus, comprising:
a collision prediction unit configured to predict a collision of a vehicle with a pedestrian existing forward of the vehicle;

a grille disposed on a front surface of the vehicle so as to be inclined while rising toward a rear region, wherein an upper end portion of the grille is attached to the vehicle in a state capable of advancing forward; and an actuator mechanism configured to cause, when the collision prediction unit predicts the collision with the pedestrian, the grille to be moved in such a manner that an upper end portion of the grille is forwardly advanced by a forward advancing amount greater than that of a lower end portion of the grille.

2. The pedestrian protection apparatus according to claim 1, wherein:

the grille is attached to the vehicle in a state swingable for changing an angle of inclination of the grille, and the actuator mechanism is configured to swing the grille to thereby cause the upper end portion of the grille to be advanced forward.

3. The pedestrian protection apparatus according to claim 2, wherein the grille is swingable about a shaft which is disposed in a region lower than the upper end portion of the grille and fixed to the vehicle.

4. The pedestrian protection apparatus according to claim 1, wherein the actuator mechanism is configured to move the grille within a range where the upper end portion of the grille is not projected from a front most end of the vehicle.

5. The pedestrian protection apparatus according to claim 1, wherein:

the collision prediction unit identifies a physique of the pedestrian; and the actuator mechanism changes, based on the physique of the pedestrian, a force applied by the actuator mechanism itself to support the grille.

6. The pedestrian protection apparatus according to claim 5, wherein the actuator mechanism is placed behind a central portion in a vehicle width direction of the grille.

7. The pedestrian protection apparatus according to claim 1, wherein the actuator mechanism is placed behind an end portion in a vehicle width direction of the grille.

8. The pedestrian protection apparatus according to claim 1, further comprising:

a hood extending from a position adjoined to a top end of the grill along a substantially horizontal direction; and a pop-up hood mechanism operatively interlocked with forward movement of the upper end portion of the grille, and configured to lift the hood upward interlockingly responding to the forward movement.

9. The pedestrian protection apparatus according to claim 8, wherein the pop-up hood mechanism is configured to lift the hood upward to a height equal to that of the top end of the grille that has been moved forward.

10. The pedestrian protection apparatus according to claim 8, wherein the pop-up hood mechanism is configured to lift the hood upward simultaneously with or subsequently to start of movement of the upper end portion of the grille.

11. The pedestrian protection apparatus according to claim 1, wherein:

the actuator mechanism comprises a link mechanism in which three arms are link connected so as to form a triangle; and the three arms comprise;

a first arm extending behind the grille from a region close to a lower end of the grille to a region close to the top end of the grill, a second arm connected to a lower end of the first arm and extending along a vehicle longitudinal direction, and a third arm joined to both an upper end of the first arm and a rear end of the second arm and configured to be extendable for changing an angle of inclination of the first arm.

* * * * *